United States Patent Office 2,919,473
Patented Jan. 5, 1960

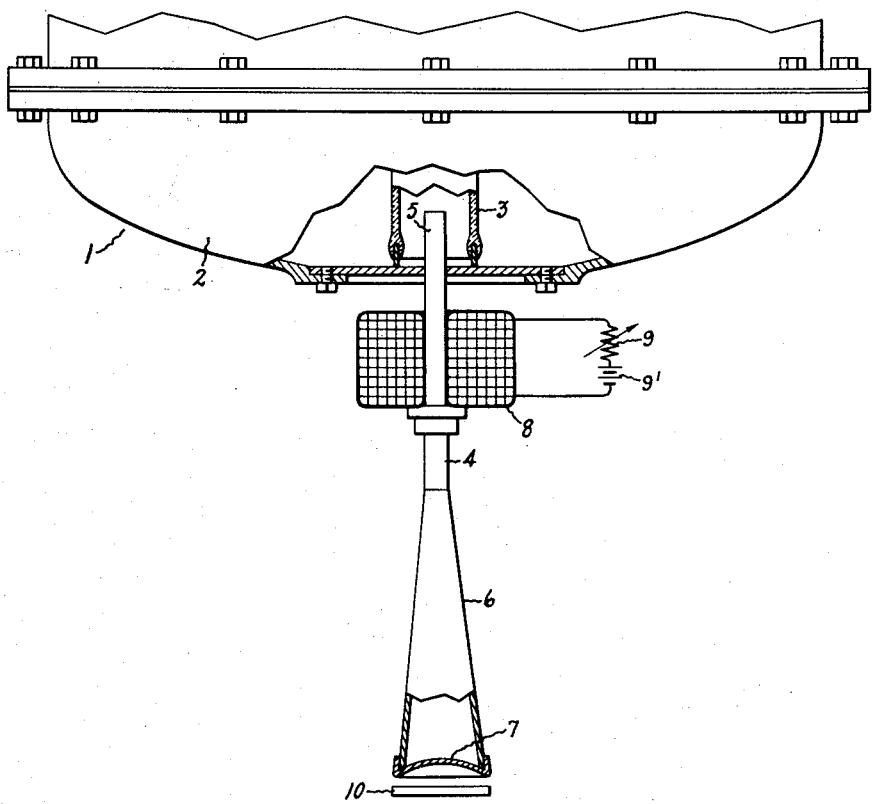
Inventor
Quintin P. Cole
His Attorney

2,919,473

MOLDING OF POLYETHYLENE IRRADIATED WITH HIGH ENERGY ELECTRONS

Quintin P. Cole, Pittsfield, Mass., assignor to General Electric Company, a corporation of New York Application June 17, 1954, Serial No. 437,477

5 Claims. (Cl. 18—48)

This invention is concerned with the treatment of irradiated polyethylene to render it moldable to give products of improved infusibility and insolubility. More particularly, the invention relates to irradiating polyethylene (either alone or with fillers, or other modifying agents) with high energy electrons, and thereafter subjecting the irradiated polyethylene to a milling action to obtain a product which can be readily molded, for instance, compression molded, extruded (over electrical conductors such as copper, aluminum, copper alloys, etc.), pressed or calendered into tapes and sheets, etc., thus yielding products which have reduced fusibility characteristics and improved solvent resistance at elevated temperatures and improved resistance to stress cracking, especially in the presence of certain chemical media.

In the copending application of Elliott J. Lawton and Arthur M. Bueche, Serial No. 324,552, filed December 6, 1952, and assigned to the same assignee as the present invention, there are disclosed and claimed polyethylene compositions irradiated with high energy electrons to obtain new products having markedly improved form stability at elevated temperatures, increased solvent resistance, and improved stress cracking properties in the presence of certain chemical materials. In accordance with the invention described and claimed in the aforesaid Lawton and Bueche application, high energy electrons obtained from high voltage accelerating apparatus are allowed to impinge upon preformed polyethylene shapes, such as tapes, sheets, various containers and bottles, etc., whereby as a result of such treatment the irradiated polyethylene is able to withstand better higher temperatures and the effects of many solvents than is possible for the unirradiated polyethylene. Although such irradiated polyethylene materials are finding extensive use in the various arts, including the enclosure art, insulating art, and packaging art, etc., nevertheless, there are many applications in which it is desirable that polyethylene having the properties of irradiated polyethylene be capable of being further molded (the term "molded" or "molding" is intended to include hereinafter all molding operations whether by compression molding, injection molding, extrusion, tape or sheet forming, calendering, etc.) into other articles as well as by dip-coating, casting, etc. For instance, it is often desirable to take polyethylene molding powder and subject it to different molding operations, such as injection molding, extrusion (for insulating purposes), compression molding, etc., to form objects of various shapes and sizes wherein these objects will have good heat and solvent resistance similar to the same properties obtained by irradiating preformed polyethylene articles in accordance with the procedure described in the aforementioned Lawton and Bueche application.

Heretofore, it was believed that after irradiation of the polyethylene with the high energy electrons, no further useful deformation, that is, molding of the polyethylene, could be obtained after the irradiation step. This belief has been a limiting feature of irradiated polyethylene in employing the latter for many of the wide applications for which polyethylene has been found so useful up to the present time.

Unexpectedly, I have found that polyethylene can be irradiated with high energy electrons and thereafter can be readily molded into useful articles of manufacture employing the various types of molding apparatus used in molding operations, for instance, flame spraying, compression molding, blow molding, extruding, injection molding, calendering, etc. These desirable objectives and unexpected advantages of moldability accompanied by improved infusibility and insolubility in the final molded state can be attained if, prior to the aforesaid molding operations, the irradiated polyethylene is subjected to a shearing or masticating action similar to the intensive mechanical deformation obtained on the usual milling rolls.

The accelerator apparatus used to irradiate the polyethylene with high energy electrons is more particularly described in the accompanying figure which shows a high voltage accelerating apparatus 1 capable of producing a beam of high energy electrons for irradiating polyethylene in accordance with the invention. High voltage accelerating apparatus 1 may be of the type disclosed in U.S. Patent 2,144,518, Westendorp. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off evacuated tubular envelope 3, is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction in operation of high voltage accelerating apparatus 1 may be found in the aforementioned Westendorp patent and in Electronics, volume 16, pages 128–133 (1944).

To permit utilization of the high energy electrons accelerated down envelope 3, there is provided an elongated metal tube 4, the upper portion of 5 of which is hermetically sealed to tank 2, as illustrated, by any convenient means such as silver solder. The lower portion 6 of tube 4 is conical in cross section to allow an increased angular spread of the electron beam. The emergence of high energy electrons from tube 4 is facilitated by end window 7 which may be hermetically sealed to tube 4 by means of silver solder. End window 7 should be thin enough to permit electrons of desired energy to pass therethrough but thick enough to withstand the force of atmospheric pressure. Stainless steel of 0.002" thickness has been found satisfactory for use with electron energies of about 230,000 electron volts or greater. Beryllium and other materials of low stopping power may also be employed effectively. By forming end window 7 in arcuate shape as shown, greater strength for resisting the force of atmospheric pressure may be obtained for a given window thickness. Desired focusing of the accelerated electron may be secured by a magnetic field generating winding 8 energized by a source of direct current 9' through a variable resistor 9.

In producing the polyethylene irradiated with high energy electrons according to the present invention, the polyethylene, whether in finely divided form, in larger particle form, in chunks, sheets, tapes, tubes, filaments, etc., is supported in the path of the electrons emerging from end window 7 as illustrated. The high energy electrons penetrate the polymeric polyethylene to a depth depending upon their energy and effect the above modifications in the properties of the material, namely, rendering it more infusible at elevated temperatures and more resistant to solubilizing effects of many solvents. Of course, the polyethylene sample in the form of discrete particles or a sheet 10 can be passed continuously under end window 7 at a velocity selected to give the desired irradiation dose. Other expedients for obtaining the irradiation of the solid polyethylene, whatever shape it may be, will be apparent to those skilled in the art. If the polyethylene is initially in a liquid form, suitable receptacles for containing it may be utilized. Substantially uniform treatment of polymeric materials having appreciable thickness can be assured by irradiating the polyethylene, first from one side and then from the other, or in some cases from both sides simultaneously. In case one is employing particles of polyethylene, agitation of the particles to obtain uniform irradiation of all the particles may be resorted to. In certain instances, it may be desirable to irradiate the polymeric materials in an atmosphere of nitrogen, argon, helium, krypton, or xenon, etc., to minimize oxidation by atmospheric oxygen.

The polyethylene referred to herein is a polymeric material, usually solid (although liquid polyethylene is not precluded) formed by the polymerization of ethylene at high temperatures and pressures. It may range in molecular weight from about 2,000 to about 16,000 to 30,000 or more for the solid form of polyethylene. It is more particularly described in U.S. Patent 2,153,553 and in Modern Plastics Encyclopedia, New York 1949, pp. 268–271. Examples of commercially available polyethylene which can be employed in the practice of the instant invention are polyethene DYNH sold by the Bakelite Corporation, Bound Brook, New Jersey; Du Pont polyethylene resin sold under the trade name "Alathon," its properties, uses, etc. being set forth in Du Pont Information Bulletin A–3584, published by the Du Pont Polychemicals Department; Marlex polyethylene manufactured and sold by Phillips Petroleum Company, etc.

One of the critical features of the present invention is the fact that the irradiation dosage should not be too high as to render the polyethylene incapable of milling to produce a readily moldable, for example, extrudable product. For this purpose, I have found that the maximum upper irradiation dosage range is about $12 \times 10^6$ R. and is advantageously within the range of about $2 \times 10^6$ R. to $10 \times 10^6$ R. Below $2 \times 10^6$ R. the irradiation dosage is usually insufficient to induce the necessary infusibility and insolubility which is a desired characteristic of the milled, irradiated polyethylene. Doses above $12 \times 10^6$ R. usually render the polyethylene unsuitable for practical milling and molding. Of additional importance in determining the proper dosage for the polyethylene, consideration should be given to the molecular weight of the polyethylene prior to irradiation since polyethylenes having higher original molecular weights require lower irradiation dosages than do polyethylenes of lower molecular weights to yield the same properties in the irradiated and milled polyethylene, namely, the desired high temperature form stability and solvent resistance after the milling operation. Generally, the minimum dosage required to impart the desired form stability and solvent resistance varies substantially inversely to the original molecular weight of the polyethylene.

The polyethylene which is subjected to irradiation may be of any size or physical state. Thus, it may be in the finely divided state, for instance, having an average particle size of about 50 to 400 microns, or may be of larger particle size, for instance, crumbs or pellets of varying size, or even chopped up particles of polyethylene derived from flat sheet or stock polyethylene. Regardless of the physical state or form of the polyethylene, it is essential that adequate irradiation with high energy electrons be given the polyethylene prior to the milling operation. As pointed out above, the effectiveness of the irradiation with high energy electrons will depend on the thickness of the particles, the manner in which it is handled, for instance, whether there is agitation or it is continuously passed under the electron beam, the molecular weight of the polyethylene, etc.

The manner whereby the irradiated polyethylene, whether in the form of particles, pellets, or even in thin sheet or tape form may be subjected to the required milling action may be varied widely employing the usual apparatus in milling operations. The equipment employed should be capable of causing a shearing action in the irradiated polyethylene such as that found in the usual rubber compounding mills which have differential rolls operating at different speeds. The milling is advantageously carried out at temperatures around at least the softening point of the irradiated polyethylene and is preferably carried out at a temperature of at least 75° C., e.g., from about 80° C. to 150° C. or higher, and usually above the melting point of the irradiated polyethylene. As rolling on the mill continues, it is generally desirable to widen the nip between the adjacent rolls of the mill to a point ranging from about 1/16" to about 1/4" or more to permit better distribution of the polyethylene product and also to avoid as much as possible undesirably affecting the irradiated polyethylene as a result of the milling operation.

In general, the milling time may be varied within wide limits depending upon such factors as the physical state of the polyethylene (whether finely divided or larger size particles, pellets, sheet material, etc.), the molecular weight of the polyethylene, the dosage to which the polyethylene has been subjected, the molding equipment in which it is to be used (for example, compression molding, injection molding, extrusion, etc.), the application intended (for example, for making molded objects, such as bottles, other enclosures, insulated conductors, etc.), the temperature of the milling, etc. Generally, milling times from about 5 minutes to as much as two or more hours, preferably from about 15 minutes to 1 hour, are usually sufficient for effecting adequate milling of the irradiated polyethylene to give a product which can be readily molded using the various molding techniques recited above. Persons skilled in the art will have little difficulty in determining the optimum milling times and temperatures which can advantageously be employed in each case in the practice of the present invention.

Obviously, other methods may be used to carry out the milling operation. Thus, it may be possible to put the irradiated polyethylene through an extrusion machine employing a worm gear wherein a similar shearing action described above is exerted on the polyethylene. In connection with the use of extrusion operations, the irradiated polyethylene, especially when in finely divided form, may be immediately charged into an extrusion apparatus and much of the prior milling eliminated and the shearing action in the extrusion machine used to take the place of the previous milling step. I prefer to employ either a Banbury mixer or compounding rolls used in the rubber industry for the milling operation for several reasons. Such types of equipment are readily available for the purpose, the use of such milling equipment will generally give optimum and most advantageous distribution of the irradiated polyethylene; finally, the use of such equipment permits the incorporation more readily of other materials which may be desirable to use with the irradiated polyethylene such as fillers, flame retardent agents, stabilizers, etc.

The milling step is critical for the practice of the present invention. Mere irradiation of the polyethylene (especially at higher irradiation dose levels) without the milling step, will not yield smooth surfaces in the subsequently molded, e.g., extruded, product; in addition, there will be an undesirable distortion of the polyethylene if it should later be subjected to elevated temperatures; finally there will be an unsatisfactory knitting of portions of the molding compound, and the result will not be a coherent molded object. By means of the milling operation, all these difficulties are obviated or greatly minimized.

In order that those skilled in the art may better understand how the present invention may be practiced, the following examples are given by way of illustration and not by way of limitation. All parts are by weight.

In carrying out the following examples, two types of polyethylene were employed. These were as follows:

*Polyethylene 1.*—This solid polyethylene (molecular weight about 21,000) was in the form of a powder and passed through a 40-mesh screen.

*Polyethylene 2.*—This solid polyethylene was of about 21,000 molecular weight and was in the form of pellets about ¼" to ⅜" in diameter. This particular polyethylene was converted by compression molding into 0.1" thick sheets for convenience in irradiation. The compression-molded sheet was then irradiated with the stated dosage of high energy electrons and then chopped into small cubes.

EXAMPLE 1

A sample of polyethylene 2 in the above-described sheet form was irradiated with high energy electrons using a dose of $5 \times 10^6$R. A portion of the irradiated polyethylene was milled on differential rolls, in one case for 15 minutes after irradiation and in the other case for 45 minutes after irradiation, both milling steps taking place at a temperature of about 125° C. Both irradiated and milled samples were then chopped into small cubes (about ⅛" in diameter) for compression molding. Samples of the two irradiated and milled polyethylenes, together with a sample of the unirradiated polyethylene, were then compression-molded into bars 0.5" x 0.5" x 5" using a pressure of about 100 p.s.i. at a temperature of about 140° C. for about 15 minutes. Each bar was then suspended under its own weight by a wire in an oven at 150° C. to test the degree of flow. The unirradiated sample stretched to about 6⅞" in about 18 minutes and was almost falling from the wire when removed from the test. The bar prepared from the irradiated polyethylene which had been milled for 15 minutes, after 6 hours at 150° C. showed a shortening to about 4⅝". The bar which was prepared from polyethylene milled 45 minutes after irradiation showed only a shrinkage of about ⅛" to ¹⁄₁₆" even after 6 hours at 150° C. The two bars molded from the irradiated and milled polyethylene were quite smooth and homogeneous in appearance after the molding operation.

EXAMPLE 2

In this example, polyethylene 1 and polyethylene 2 (described above) after irradiation and milling were extruded onto a 0.032" nickel-coated copper wire employing a 0.060" round die. In each case the extruded product was quenched in water after traveling about 2 feet through the air from the extruder. The wire speed in each instance was about 8 to 10 feet per minute while the temperature was varied at the rear barrel, front barrel and die. Some of the polyethylene coatings employed were previously irradiated with varying doses and subjected to different milling times employing the usual differential compounding rolls for the purpose. As was done before, polyethylene 2 was compression-molded into a 0.1" thick sheet prior to irradiation, and thereafter chopped up into fine particles suitable for extruding purposes. The following Table I shows the results of the various tests conducted on the extruded wires employing the different types of irradiated and milled polyethylenes together with controls which use polyethylene which was either unirradiated or else was irradiated but not subjected to any milling action. Table I, in addition, shows results of environmental stress cracking tests in accordance with the method described by De Coste, Malm and Walder in Industrial and Engineering Chemistry, 43 117 (1951) employing in one instance acetic acid as the fluid in which the stress cracking test was carried out, and in another instance a surface active agent, specifically Triton X–100, as the other testing fluid. The flow tests described in Table I were carried out by stripping short pieces of insulation from the conductor and heating the stripped insulation for 3 hours at 150° C. and determining whether the tube structure of the stripped insulation remained intact.

*Table I*

| Sample No. | 1 | 2 | 3 | 4 | 5 | 6 | Control |
|---|---|---|---|---|---|---|---|
| Polymethylene No. | 1 | 1 | 2 | 2 | 2 | 2 | 1. |
| Dose ($\times 10^6$ R) | 2.5 | 2.5 | 2.5 | 5 | 5 | 10 | 0. |
| Form when irradiated | Powder | Powder | Sheet | Sheet | Sheet | Sheet | |
| Milling time (min.) at 125° C. | 0 | 5 | 5 | 0 | 45 | 100 | |
| Extrusion Temp. (° C.): | | | | | | | |
| Rear barrel | 150 | 125 | 125 | 125 | 120 | 120 | |
| Front barrel | 170 | 135 | 140 | 140 | 135 | 135 | |
| Die | 200 | 215 | 250 | 250 | 245 | 250 | |
| Appearance of Extruded Product | Many bubbles, surface rough. | No bubbles, surface smooth. | No bubbles, surface smooth. | Extremely rough coating. | No bubbles, surface smooth. | Surface somewhat rough.[1] | |
| Cracking Survival: | | | | | | | |
| In Acetic Acid | 4 hrs. | 8 hrs. | 12 hrs. | | 22 hrs. | | 5 min. |
| In Triton X–100 | | | | | Intact after 55 days. | | 10 min. |
| Flow Test (3 hrs. at 150°) | | Slight flow where stressed. | Slight flow where stressed. | | No flow. | | Drop formed in 20 min. |

[1] This slightly rough, although coherent and heat-resistant, surface could be made smoother if a longer milling time was employed.

It will be clearly apparent from the above Table I that it is possible to irradiate polyethylene in various forms, including powder and sheet form, mill the irradiated material, and obtain useful extruded coatings which exhibit good physical appearance while at the same time retaining the desirable properties of chemical resistance, resistance to stress cracking, and reduced flowability at elevated temperatures inherent in preformed irradiated polyethylene objects. That the infusibility properties as well as the resistance to stress cracking could still be retained at this low level of irradiation and still have properties which were comparable to polyethylene irradiated at much higher dosages, was entirely unexpected and in no way could have been predicted. It should be recognized, as pointed out previously, that the dosage of irradiation will vary depending on such conditions as the type of polyethylene used, the degree of milling to which the irradiated polyethylene will be subjected, the application involved, as well as the technique whereby the irradiated and milled polyethylene will be molded.

EXAMPLE 3

Polyethylene No. 2 (previously described) containing 0.5% by weight, thereof of a stabilizer toward oxidation, namely Agerite White (which is N,N'-dinaphthyl-p-phenylene diamine) was compression molded into sheets about 0.1″ thick and irradiated with various dose levels as indicated below, and thereafter hot milled for 45 minutes at a temperature of about 125° C., after which the irradiated and milled samples were chopped into fine pellets. As a control, one sample of the sheet was not subjected to any irradiation or milling while other samples of the molded sheet were subjected to varying irradiation doses without any milling step. A series of tests were carried out in which the pellets were charged into Royle #½ extruder equipped with a Hartig cylinder and crosshead for coating wire. A screen pack consisting of 40, 40, 100 and 150 mesh screens was used. Operating temperatures were maintained at about 121° C. in the rear cylinder, 204° C. in the front cylinder, and 232° C. in the die.

A sizing die with an opening of 0.09″ and a leader with a hole of about 0.052″ diameter were used in conjunction with #16 A.W.G. copper wire. The wire was preheated to a temperature of about 85–90° C. as measured by a thermocouple in a brass sleeve through which the wire passed before entering the crosshead. The wire speed was maintained at 15 feet per minute and cooling was effected by passing the coated wire through a water bath 2 feet long. The following Table II shows the extruder screw speed used with the various types of irradiated polyethylene employed.

*Table II*

| Sample No. | Irradiation Dose ($\times 10^6$ R) | Milling Time, Minutes | Screw Speed, r.p.m. |
|---|---|---|---|
| 1 | 0 | 0 | 23 |
| 2 | 3 | 0 | 44 |
| 3 | 4 | 0 | 57 |
| 4 | 5 | 0 | 79 |
| 5 | 6 | 0 | 79 |
| 6 | 3 | 45 | 23 |
| 7 | 4 | 45 | 23 |
| 8 | 5 | 45 | 23 |
| 9 | 6 | 45 | 23 |
| 10 | 7 | 45 | 23 |

In samples Nos. 2 through 5 (which relate to irradiated but unmilled materials) the coating obtained was extremely rough. In samples Nos. 6 through 10 (which concerned irradiated and milled resins) the coating in each case was smooth and uniform. With specific regard to the latter samples, as the irradiation dose increased up to a point of about $6 \times 10^6$ R. (sample No. 9), the appearance of the coating became duller; at $7 \times 10^6$ R. (sample No. 10) a slight feeling of sandiness on the surface was noted.

The use of higher irradiation doses will require increased milling times and probably higher temperatures in order to minimize any undesirable roughness or lack of smoothness of the coating compared to coatings obtained when using lower irradiation doses. The requirements for lengthy milling times may be reduced by effecting a decrease in the size of the openings in the screen pack by increasing the amount of mastication in the cylinder. The use of finely divided or finely powdered irradiated polyethylene in place of the irradiated sheets may also reduce the amount of milling required in order to obtain smooth sheets even at higher irradiation doses.

The degree to which the extruded irradiated resin polyethylene possessed the desirable property of resistance to flow at high temperatures was tested in samples Nos. 1, and 6 through 10 by twisting a piece of each coated wire upon itself and also by testing pieces of insulation stripped from the wire. After hanging in an oven at 150° C. for 24 hours, the coated wire test pieces were examined and it was found that considerable flow had occurred in the unirradiated sample No. 1, only moderate flow where the dose was $3 \times 10^6$ R., slight flow at $4 \times 10^6$ R. and essentially no flow at $5 \times 10^6$R. to $7 \times 10^6$ R. The test pieces of unsupported insulation behaved similarly except that they showed some shrinkage when first placed in the oven after which the length remained constant in those cases where the irradiation dose was $5 \times 10^6$ R. up to an including $7 \times 10^6$ R.

EXAMPLE 4

The extruder described in Example 3 was equipped with a sheeting die 0.010″ x 3″ in place of the wire coating crosshead and used to extrude irradiated polyethylene resin through a screen pack consisting of 40, 40, 100 and 100 mesh screens. When the resin used was polyethylene No. 2 (described above) containing 0.5%, by weight, Agerite White irradiated to a dose level of $3 \times 10^6$ R. and hot milled for 45 minutes at about 125° C., a smooth uniform film was extruded and this could be drawn down to various widths and thicknesses by regulating the speed of the take-up. Even at a dose level of $5 \times 10^6$ R., all other conditions being the same, a continuous film was again obtained. The dimensions of the film varied with operating conditions but are exemplified by the measurements of 0.018″ x 2″ recorded at one point. A piece of this film suspended freely in an oven at 150° C., at first increased somewhat in width and thickness and decreased in length but thereafter remained essentially constant in dimension for two hours whereas unirradiated film flowed freely when tested under similar conditions.

EXAMPLE 5

Polyethylene No. 2 (described above) containing 0.5%, by weight, thereof Agerite White was irradiated to a dose level of $5 \times 10^6$ R. and thereafter hot milled at 125° C. for about 45 minutes after which it was stirred into boiling trichloroethylene until a homogeneous solution of considerable viscosity resulted. Stranded copper wire was dipped into the hot solution twice, air dried to eliminate most of the solvent and finally baked at 150° C. for 50 minutes to give a smooth continuous coating which had greatly improved heat resistance and resistance to stress cracking as compared to unirradiated polyethylene. When a portion of the above-mentioned trichloroethylene solution was poured onto a porcelain plate and immediately covered with another plate and allowed to dry in a 100° C. oven, there was obtained a film disk which had a high degree of form stability at 150° C. as well as good dimensional stability. It could be readily cold drawn into an elongation of about 500% without breaking and was found to be very tough.

It will of course be apparent to those skilled in the art that in addition to the solid polyethylenes employed in the foregoing examples, other polyethylenes of different molecular weights and different derivation may be used without departing from the scope of the invention. Moreover, different irradiation doses and milling conditions may be employed within the scope of the invention herein described and claimed.

By means of my invention, it is possible to mold irregular shaped objects of desired thicknesses to obtain products whose properties, for instance, infusibility and insolubility, as well as crack resistance under stress conditions are comparable to those of polyethylene irradiated in situ in the finally formed object.

The fact that this low degree of irradiation dose together with the milling step would give these essentially equivalent properties was entirely unexpected and in no way could have been predicted in advance.

The moldable irradiated polyethylene resins included within the scope of the present invention may be employed for extrusion purposes in insulating electrical wires, may be used to mold sterilizable containers and packaging material which can be heated at elevated temperatures without detrimental effects, can be used to mold articles which require such properties as resistance to solvents, elevated temperatures, and cracking environments, and in general, can be employed in the fabrication of various objects which can use to advantage the special properties resulting from a moderate degree of cross-linking induced by the irradiation with high energy electrons. A particular advantage to be derived from the irradiated and milled polyethylene as a finely divided product lies in the fact that the subsequent fabrication may be economically feasible on a small scale, whereas in the case of bombarding a fabricated article with high energy electrons, a relatively large volume of business in an individual article must be available in some cases to justify the large investment in electronic equipment and other processing facilities.

It will of course be understood that after irradiating the polyethylene, milling it, and fabricating it into various shapes and sizes, including insulation for conductors, tape, sheet material, molded articles, such as bottles, etc., the latter may in turn be subjected to additional irradiation with high energy electrons to enhance further the properties of the formed polyethylene over and above those already obtained by virtue of the practice of the present invention. This additional irradiation of high energy electrons will further increase the infusibility and insolubility of the polyethylene to many solvents at elevated temperatures and improve the stress cracking of the polyethylene in the presence of various chemicals.

The Roentgen units, designated as "R." in the foregoing description of the invention and in the appended claims, are intended in their usual connotation and are defined as the amount of radiation that produces one electrostatic unit of charge or ion pairs per millilitre of dry air under standard conditions and, as employed herein, refer to the amount of electron radiation measured with an air equivalent ionization chamber at the position of the surface of the polyethylene being irradiated. Alternatively, in place of Roentgen units one can employ the term "Roentgen equivalent physical" or more briefly "REP."

What I claim as new and desire to secure by Letters Patent of the United States is:

1. The process for preparing an extruded irradiated polyethylene which comprises (1) irradiating polyethylene with high energy electrons emanating from a high voltage accelerating apparatus in which the electrons have energies from about 50,000 to 20 million electron volts, the irradiation being carried out within a dose range of from about $3 \times 10^6$ REP to $10 \times 10^6$ REP, (2) milling the irradiated polyethylene by means of a shearing action at a temperature above 75° C. for a time ranging from 5 minutes to 2 hours to render the irradiated polyethylene extrudable, and (3) extruding the milled product.

2. The process for preparing an extruded irradiated polyethylene which comprises (1) irradiating discrete particles of polyethylene with high energy electrons emanating from a high voltage accelerating apparatus in which the electrons have energies from about 50,000 to 20 million electron volts, the irradiation being carried out within a dose range of from about $3 \times 10^6$ REP to $10 \times 10^6$ REP, (2) milling the irradiated polyethylene by means of a shearing action at a temperature above 75° C. for a time ranging from 5 minutes to 2 hours to render the irradiated polyethylene extrudable, and (3) extruding the milled product.

3. The process for preparing an extruded polyethylene which comprises (1) irradiating polyethylene sheet material with high energy electrons emanating from a high voltage accelerating apparatus in which the electrons have energies from about 50,000 to 20 million electron volts, the irradiation being carried out within a dose range of from about $3 \times 10^6$ REP to $10 \times 10^6$ REP, (2) milling the irradiated polyethylene by means of a shearing action at a temperature above 75° C. for a time ranging from 5 minutes to 2 hours to render the irradiated polyethylene extrudable, and (3) extruding the milled product.

4. The process which comprises (1) irradiating polyethylene with high energy electrons emanating from a high voltage accelerating apparatus in which the electrons have energies of from about 50,000 to 20 million electron volts, the irradiation being carried out within a dose range of about $3 \times 10^6$ REP to $10 \times 10^6$ REP, (2) milling the irradiated polyethylene by means of a shearing action at a temperature above 75° C. for a time ranging from 5 minutes to 2 hours to obtain a product having decreased solubility and fusibility at elevated temperatures as compared to products made from the unirradiated polyethylene and (3) extruding the milled product.

5. The process of preparing an insulated electrical conductor which comprises (1) irradiating polyethylene with high energy electrons from a high voltage accelerating apparatus within a dose range of from $3 \times 10^6$ REP to $10 \times 10^6$ REP, the electrons having energies of from about 50,000 to 20 million electron volts, (2) milling the irradiated polyethylene by means of a shearing action at a temperature above 75° C. for a time ranging from about 5 minutes to 2 hours to render the irradiated polyethylene extrudable, and extruding the irradiated and milled product over an electrically conducting metallic core.

References Cited in the file of this patent

UNITED STATES PATENTS

| | | |
|---|---|---|
| 2,582,327 | Haine | Jan. 15, 1952 |
| 2,586,820 | Hemperly et al. | Feb. 26, 1952 |
| 2,659,707 | Youngquist et al. | Nov. 17, 1953 |
| 2,691,607 | Harvey | Oct. 12, 1954 |

FOREIGN PATENTS

| | | |
|---|---|---|
| 582,559 | Great Britain | Nov. 20, 1946 |

OTHER REFERENCES

Symposium on "Utilization of Radiation from Fission Products," Harwell, A.E.R.E., C/R 1231, pages 112–116, February 23–24, 1953.

"Nature," July 11, 1953, page 76.

"Nature," Jan. 24, 1953, page 167 (Charlesby).

Proc. Royal Soc. of London, November-December 1952 (vol. 215), pages 187–191, 203, 206, 211, 212.

"Bakelite Polyethylene," published by Bakelite Division of Union Carbide and Carbon Corporation, 1950, pages 12, 13, 14, 15, 16, 17.